Sept. 13, 1949.  KUAN-HAN SUN  2,481,701
HIGH DISPERSION FLUOSILICATE GLASSES
Filed Jan. 29, 1946

× = SYSTEM A
○ = SYSTEM B
△ = SYSTEM C

KUAN-HAN SUN
INVENTOR

BY Newton M. Parris
ATTORNEY

Patented Sept. 13, 1949

2,481,701

UNITED STATES PATENT OFFICE 2,481,701

HIGH DISPERSION FLUOSILICATE GLASSES

Kuan-Han Sun, Rochester, N. Y., assignor to Eastman Kodak Company, Rochester, N. Y., a corporation of New Jersey Application January 29, 1946, Serial No. 644,182

6 Claims. (Cl. 106—52)

This invention relates to optical glass and particularly to glasses of novel composition and having unusual optical properties.

In general, flint glasses have higher dispersions, or lower Abbe values, than other glasses of the same refractive indices, or lower refractive indices for the same dispersions or Abbe values. It is often desirable, from the optical point of view, to have glasses with even higher dispersions than the presently available flint glasses. It is an object of this invention to furnish such glasses which also fill the other requirements for optical glasses, such as transparency, reasonable weather resistance, the ability to take a high polish, and to withstand manufacturing operations.

This object is attained by the introduction into a silicate glass batch of relatively large amounts of fluoride. Fluor crown glasses have long been known, but the amount of fluoride present in them has been small, much less than the proportions here disclosed.

Figure 1:
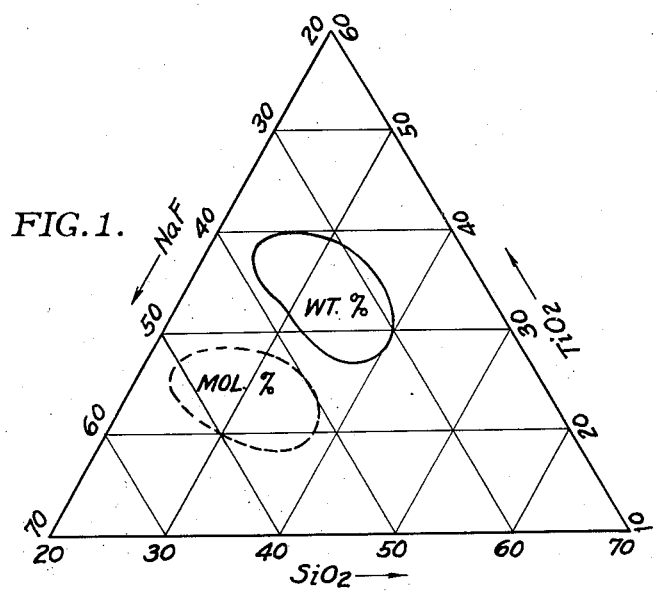
Figure 2:
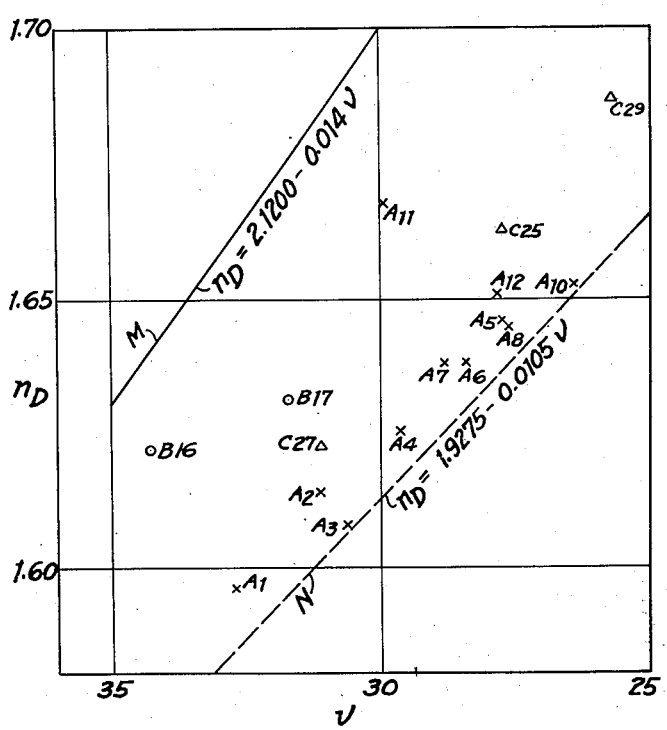

Reference will be made to the accompanying sheet of drawings wherein Figure 1 is a diagram showing the proportions useful in glass making, and Figure 2 is a diagram showing the optical properties of the glasses.

In general, the composition of the glasses may be represented by the ternary system of the general formula $AF$—$RO_n$—$SiO_2$, where $AF$ represents alkali metal fluoride, particularly $NaF$ or $KF$ or a mixture of them, and $RO_n$ represents $TiO_2$ or $CbO_{2.5}$ (usually as $Cb_2O_5$) or a mixture of them. The proportions in which these constituents may be combined successfully to form a glass is found in practice to be limited. They very definitely cannot be combined in all proportions.

The approximate limits in which glass formation is attained is indicated in the following general formulas, in which the ranges of the per cent by weight and molal proportions are given:

APPROXIMATE LIMITS OF GLASS FORMATION REGIONS

System A.—$NaF$—$TiO_2$—$SiO_2$

| | Wt. per cent | mol. per cent |
|---|---|---|
| NaF | 29–38 | 40–51 |
| TiO₂ | 26–39 | 19–28 |
| SiO₂ | 26–40 | 22–38 |

System B.—$NaF$—$CbO_{2.5}$—$SiO_2$

| | Wt. per cent | mol. per cent |
|---|---|---|
| NaF | 22–28 | 39–46 |
| CbO₂.₅ | 32–54 | 17–29 |
| SiO₂ | 20–43 | 26–44 |

System C.—$KF$—$TiO_2$—$SiO_2$

| | Wt. per cent | mol. per cent |
|---|---|---|
| KF | 25–33 | 29–36 |
| TiO₂ | 26–40 | 21–33 |
| SiO₂ | 30–46 | 33–48 |

It is to be noted that the molecular amount of potassium fluoride that can be introduced is materially less than of sodium fluoride. It is also to be noted that glass may be formed from a batch containing about 50 mol. per cent of NaF. The atomic or ionic ratio of fluorine to oxygen in such a formula is about 1:2.

System A is particularly desirable from the point of view of optical properties. Figure 1 indicates for that system, in a ternary diagram, the limits of the region of glass formation, both in weight and mole per cent, by full and broken lines, respectively. The boundary lines indicated are empirical and do not indicate a sharply defined boundary under all conditions, since glass formation is a function of experimental conditions such as the size of the melt, rate of cooling, shape of the final glass piece, and other operating conditions. They represent the limits found experimentally by me with batches of the size and under the conditions described hereinafter. Analogous diagrams could be shown for the other systems, but Figure 1 is sufficient to show graphically how comparatively narrow are the operative limits of the proportions within which the ingredients may be used under any given set of conditions. Other examples differing specifically from those herein given are to be found in the co-pending application of E. F. Osborn and P. F. De Paolis, Serial No. 722,276, filed January 15, 1947.

Specific examples will now be given within the ambit of the general formulas given above, W designating weight per cent, and M, mole per cent; and the values, where known, of $n_D$, the index of refraction of the D line, and of $\nu$, the Abbe value, being also given.

System A

| Example No. | NaF | | TiO₂ | | SiO₂ | | $n_D$ | $\nu$ |
|---|---|---|---|---|---|---|---|---|
| | W | M | W | M | W | M | | |
| 1 | 34 | 45.1 | 27 | 18.8 | 39 | 36.1 | 1.5961 | 32.71 |
| 2 | 33 | 44.1 | 29 | 20.4 | 38 | 35.5 | 1.614 | 31.1 |
| 3 | 37 | 48.9 | 31 | 21.5 | 32 | 29.6 | 1.608 | 30.6 |
| 4 | 32 | 43.2 | 32 | 22.8 | 36 | 34.0 | 1.6255 | 29.6 |
| 5 | 30 | 40.9 | 32 | 22.9 | 38 | 36.2 | 1.646 | 27.7 |
| 6 | 33.3 | 44.9 | 33.3 | 23.6 | 33.3 | 31.5 | 1.638 | 28.4 |
| 7 | 32 | 43.5 | 34 | 24.3 | 34 | 32.2 | 1.638 | 28.8 |
| 8 | 35 | 47.0 | 35 | 24.7 | 30 | 28.3 | 1.645 | 27.61 |
| 9 | 34 | 46.0 | 36 | 25.6 | 30 | 28.4 | | |
| 10 | 38 | 50.8 | 38 | 26.7 | 24 | 22.5 | 1.6531 | 26.37 |
| 11 | 34 | 46.2 | 38 | 27.2 | 28 | 26.6 | 1.6680 | 29.95 |
| 12 | 31.8 | 43.2 | 33.6 | 24.0 | 34.6 | 32.8 | 1.6511 | 27.8 |

System B

| Example No. | NaF | | CbO$_{2.5}$ | | SiO$_2$ | | $n_D$ | $\nu$ |
|---|---|---|---|---|---|---|---|---|
| | W | M | W | M | W | M | | |
| 13 | 25 | 39.0 | 35 | 17.3 | 40 | 43.7 | | |
| 14 | 25 | 40.0 | 39 | 19.7 | 36 | 40.3 | | |
| 15 | 24 | 39.6 | 43 | 22.4 | 33 | 38.0 | | |
| 16 | 28 | 45.5 | 44 | 22.6 | 28 | 31.9 | 1.6216 | 34.21 |
| 17 | 27 | 44.1 | 44 | 22.7 | 29 | 33.2 | 1.6313 | 31.7 |
| 18 | 26 | 42.2 | 46 | 24.2 | 28 | 33.6 | | |
| 19 | 26 | 43.8 | 48 | 25.6 | 26 | 30.6 | | |
| 20 | 25 | 42.9 | 50 | 27.1 | 25 | 30.0 | | |
| 21 | 26 | 45.0 | 52 | 28.4 | 22 | 26.6 | | |

As an example of the presence of both titanium and columbium oxides, the following example is given:

| Example No. | NaF | | TiO$_2$ | | CbO$_{2.5}$ | | SiO$_2$ | |
|---|---|---|---|---|---|---|---|---|
| | W | M | W | M | W | M | W | M |
| 22 | 30 | 44.2 | 13 | 10.1 | 23 | 10.7 | 34 | 35.0 |

System C

| Example No. | KF | | TiO$_2$ | | SiO$_2$ | | $n_D$ | $\nu$ |
|---|---|---|---|---|---|---|---|---|
| | W | M | W | M | W | M | | |
| 23 | 31 | 34.0 | 27 | 21.5 | 42 | 44.5 | 1.605 | |
| 24 | 26 | 28.8 | 30 | 24.1 | 44 | 47.1 | | |
| 25 | 32 | 35.3 | 30 | 24.1 | 38 | 40.6 | 1.663 | 27.7 |
| 26 | 28 | 31.1 | 32 | 26.9 | 40 | 43.0 | 1.645 | |
| 27 | 30 | 33.6 | 35 | 28.5 | 35 | 37.9 | 1.623 | 31.1 |
| 28 | 26 | 29.8 | 36 | 29.4 | 38 | 40.8 | | |
| 29 | 30 | 34.0 | 39 | 32.1 | 31 | 33.9 | 1.687 | 25.7 |

While the systems described above are described as purely ternary, it is to be understood that other ingredients usual in glass making may be added within the scope of the invention. An example of such a variation in system is given below:

EXAMPLE 30

| | W | W |
|---|---|---|
| Sodium fluoride (NaF) | 29.0 | 42.0 |
| Titanium oxide (TiO$_2$) | 25.0 | 19.0 |
| Tungsten oxide (WO$_3$) | 10.0 | 2.6 |
| Silica (SiO$_2$) | 36.0 | 36.4 |
| $n_D$ | 1.6889 | |
| $\nu$ | 29.5 | |

The partial dispersions of some of the glasses have been ascertained and are given in the following table:

| Example No. | $n_{(F-C)}$ | $n_{(h-z)}$ | $n_{(z-F)}$ | $n_{(F-D)}$ | $n_{(s-C)}$ | $n_{(D-A')}$ |
|---|---|---|---|---|---|---|
| 1 | 0.01822 | 0.00972 | 0.01092 | 0.01308 | 0.00960 | 0.01087 |
| 2 | .01978 | .01068 | .01189 | .01422 | .01041 | |
| 8 | .02337 | .01305 | .01440 | .01687 | .01222 | |
| 10 | .02476 | .01398 | .01534 | .01789 | .01290 | |
| 11 | .02574 | .01456 | .01595 | .01860 | .01342 | |
| 12 | .02342 | | .01437 | .01689 | | |
| 16 | .01817 | | .01081 | .01291 | .00975 | |
| 25 | .02389 | | | | | |
| 27 | .02001 | | | | | |
| 29 | .02672 | | | | | |

Referring to the chart of Figure 2 in which the coordinates are $n_D$ and $\nu$, the lines M and N indicate the lower limit of refractive indices of the generally available flint glasses and of the present glasses, respectively, these being calculated from the equations.

(M) $n_D = 2.1200 - 0.014\ \nu$
(N) $n_D = 1.9275 - 0.0105\ \nu$

Points are indicated by the example numbers in this figure for certain of the glasses. As is evident, they all fall within the band between the two lines and in general closer to the line N than to M, particularly those of System A (Examples 1 to 12). So far as I am aware, glasses have not hitherto been known having properties extending throughout this region.

In making these glasses, anhydrous powdered raw materials should be used. The batch may be mixed uniformly and introduced into a covered platinum crucible or beaker. For a batch of 400 grams, coming within Systems A or B, heating at 1150–1200° C. for about one and one-half hours is sufficient to obtain a clear and fluid liquid if stirred occasionally with a platinum stirrer. The melting temperature varies with the different systems and particular compositions. With batches of System C, a temperature about 100° C. higher is necessary.

The greater the percentage of titanium or columbium oxide, the higher is the required temperature and the longer the time of melting; and, conversely, higher percentages of alkali fluorides lower both the time and temperature required. Since the fluorides mentioned melt at a relatively low temperature (992° C. for NaF or 857° C. for KF) to a fluid liquid, the titanium and columbium oxides tend to sink, and stirring is therefore necessary to facilitate complete solution and reaction of the batch ingredients.

After complete solution, the temperature may be lowered somewhat and stirring continued to insure uniformity. The liquid glass is then poured into a mold previously heated to about 280–460° C. It is then slowly cooled in the mold to room temperature.

There is a tendency for the glass containing titanium to have a slightly yellowish tint. This has been found partly to be the case when melting of the batch takes place in a platinum vessel. This color can be nearly or completely eliminated if melting is performed in a vessel made of a glass of over 96% silica. Such a glass is described in the Journal of the American Ceramic Society, October 1, 1944, pages 299–305 and is marketed under the trade-mark VYCOR. This eliminates the initial action of the batch ingredients when they are most corrosive in their action on platinum. After solution, the batch may be poured into a platinum vessel and stirred and may remain there before pouring into a mold as long as an hour without serious discoloration.

Having thus described my invention, what I claim is:

1. An optical glass in which $n_D$ lies between 1.58 and 1.70, and $\nu$ lies between 25 and 35, resulting from fusion of a batch comprising essentially by weight alkali metal fluoride chosen from the group consisting of the fluoride of sodium, the fluoride of potassium, and a mixture of the fluorides of sodium and potassium, 22 to 38 per cent; oxide chosen from the group consisting of the oxide of titanium, the oxide of columbium, and a mixture of the oxides of titanium and columbium, 26 to 54 per cent; and silica, 20 to 46 per cent.

2. An optical glass in which $n_D$ lies between 1.58 and 1.70 and $\nu$ lies between 25 and 35, resulting from fusion of a batch comprising essentially by weight a fluoride chosen from the group consisting of the fluoride of sodium, the fluoride of potassium, and a mixture of the fluorides of sodium and potassium, 25 to 38 per cent; titanium oxide, 26 to 40 per cent; silica, 26 to 46 per cent.

3. An optical glass consisting of sodium fluoride, 29 to 38 per cent by weight; titanium oxide, 26 to 39 per cent; and silica, 26 to 40 per cent.

4. An optical glass resulting from fusion of a batch consisting of sodium fluoride, 22 to 28 per cent by weight; columbium oxide, 32 to 54 per cent; and silica, 20 to 43 per cent.

5. An optical glass resulting from fusion of a batch consisting of potassium fluoride, 25 to 33 per cent by weight; titanium oxide, 26 to 40 per cent; and silica, 30 to 46 per cent.

6. A glass as described in claim 1 containing also tungsten oxide in an amount not over 10 per cent by weight.

KUAN-HAN SUN.

No references cited.